United States Patent [19]
von Kreuter

[11] Patent Number: 4,566,612
[45] Date of Patent: Jan. 28, 1986

[54] APPARATUS FOR DISPENSING FLOWABLE MATERIAL

[75] Inventor: Alan von Kreuter, Darien, Conn.

[73] Assignee: Popsicle Industries, Inc., Englewood, N.J.

[21] Appl. No.: 532,638

[22] Filed: Sep. 15, 1983

[51] Int. Cl.[4] .......................................... G01F 11/04
[52] U.S. Cl. .................................... 222/309; 222/494; 137/846
[58] Field of Search ............... 222/491, 494, 498, 309, 222/212, 213; 137/844, 846; 285/420

[56] References Cited

U.S. PATENT DOCUMENTS

| | | | |
|---|---|---|---|
| 823,591 | 6/1906 | Eager | 285/420 |
| 1,596,520 | 8/1926 | Eskholme . | |
| 2,216,890 | 10/1940 | Philipps . | |
| 2,753,091 | 7/1956 | Herzig | 222/491 |
| 2,761,605 | 9/1956 | Pahl . | |
| 2,898,007 | 8/1959 | Gassaway | 222/212 |
| 2,904,225 | 9/1959 | Earles | 222/494 |
| 2,989,002 | 6/1961 | Dobkin . | |
| 3,096,914 | 7/1963 | Kerr | 222/494 |
| 3,121,578 | 2/1964 | Moses | 222/494 |
| 3,211,340 | 10/1965 | Zander et al. | 222/494 |
| 3,273,760 | 9/1966 | Frankenberg . | |
| 3,324,906 | 6/1967 | Chu . | |
| 3,366,261 | 1/1968 | Dewey . | |
| 3,463,159 | 8/1969 | Heimlich | 137/846 |
| 3,506,163 | 4/1970 | Rauh . | |
| 3,884,396 | 5/1975 | Gordon . | |
| 3,923,210 | 12/1975 | Jackson | 222/494 |
| 4,454,967 | 6/1984 | Carr | 222/494 |

Primary Examiner—H. Grant Skaggs
Attorney, Agent, or Firm—Panitch Schwarze Jacobs & Nadel

[57] ABSTRACT

An apparatus for dispensing flowable material from a flowable material source comprises a dispensing means for receiving and dispensing the material under pressure and conduit means in communication with the dispensing means for receiving the dispensed material. A self-closing elastomeric flap valve surrounds and is sealed against the conduit means. The flap valve has a closure portion which is pre-stressed to remain closed when no pressure is applied to the dispensed material and which opens to prevent the free flow of material therethrough upon the application of pressure sufficient to force the dispensed material through the closure portion. A clamping means may be employed for securing the flap valve to the conduit means.

1 Claim, 4 Drawing Figures

APPARATUS FOR DISPENSING FLOWABLE MATERIAL

BACKGROUND OF THE INVENTION

The present invention relates generally to an apparatus for dispensing flowable material and, more particularly, to a self-closing elastomeric flap valve for use in such an apparatus to prevent leakage of the flowable material.

The present invention is employed for the dispensing of flowable material, particularly non-homogeneous flowable material, and is particularly adapted for the filling of containers with a precise, predetermined quantity of such material. One such non-homogeneous material which may be dispensed by the present invention is partially frozen ice cream which contains randomly interspersed solids which may have various particle sizes. For example, the ice cream may include broken cookies, chocolate chips, broken confectionary products, whole or broken nuts or the like.

As previously stated, the present invention includes an elastomeric flap valve, the flap valve being self closing to prevent the leakage of the flowable material when the material is not being dispensed, for example when the containers for the material are being positioned for filling. The flap valve surrounds the dispensing output conduit and when opened by the pressurized flow of the material, is adapted to provide a passageway or conduit having substantially the same diameter as the output conduit to permit the unimpeded flow of the material to the containers. When closed, the flap valve provides a tight seal to prevent leakage of the material. If solid particles are located within the flap valve when it closes, the flap valve closure portion conforms to the solid particles to maintain the tight seal.

The elastomeric flap valve is readily removable to facilitate cleaning of the dispensing apparatus. In addition, if either the flap valve or the remainder of the apparatus becomes clogged for example, due to the one or more of the solid particles becoming lodged therein, the flap valve may be readily removed to dislodge or otherwise unclog the apparatus without unduly affecting the container filling operation.

SUMMARY OF THE INVENTION

Briefly stated, the present invention comprises an apparatus for efficiently dispensing flowable material from a flowable material source. The apparatus comprises dispensing means for receiving material from the material source and for dispensing the material under pressure. Conduit means, in communication with the dispensing means, are provided for receiving the dispensed material. A self-closing elastomeric flap valve having a body portion which surrounds and is sealed against the conduit means is also provided. The flap valve has a closure portion which is pre-stressed to remain closed to prevent leakage when no pressure is applied to the dispensed material and which opens to permit the free flow of material therethrough upon the application of sufficient pressure upon the dispensed material to force the material through the closure portion. A clamping means extends around the flap valve body portion for securing the flap valve to the conduit means.

BRIEF DESCRIPTION OF THE DRAWING

The foregoing summary, as well as the following detailed description of a presently preferred embodiment of the invention will be better understood when read in conjunction with the appended drawing. For the purpose of illustrating the invention there is shown in the drawing an embodiment which is presently preferred, it being understood, however, that this invention is not limited to the precise arrangement and instrumentality shown and described. In the drawing.

DESCRIPTION OF A PREFERRED EMBODIMENT

Figure 1:
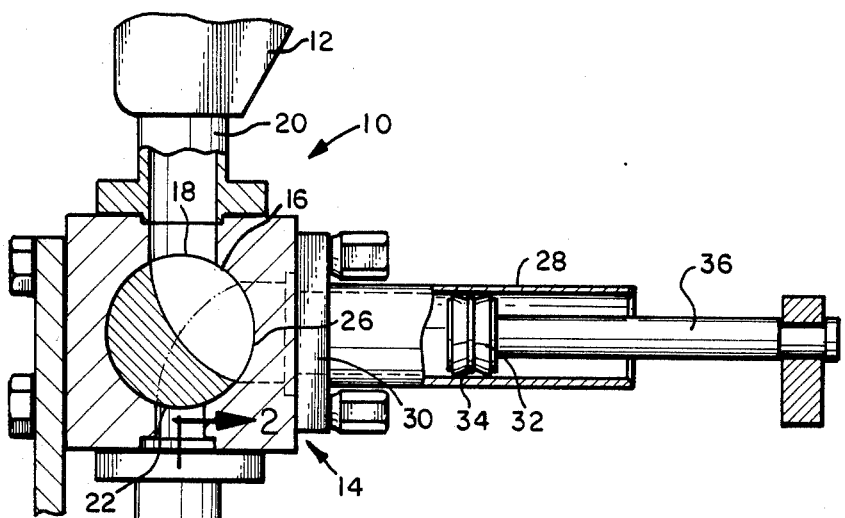
FIG. 1 is a side elevation view, partially in section, of an apparatus for dispensing flowable material in accordance with the present invention.

Referring to the drawing, wherein like numerals indicate like elements throughout, there is shown in FIG. 1 a side elevation view of an apparatus 10 generally for dispensing flowable material in accordance with the present invention.

In the presently preferred embodiment, the flowable material being dispensed comprises a confection product, for example, partially frozen ice cream having randomly interspersed solids of varying particle size suspended therein. The solids can be of various types including broken cookies, chocolate chips, broken confectionary products, nuts or the like.

The flowable material is obtained from a suitable source, in the presently preferred embodiment, a container or hopper 12 of partially frozen ice cream received from, for example, an ice cream making machine (not shown). While the present embodiment relates to the dispensing of partially frozen ice cream having randomly interspersed solids it should be understood that the invention is not so limited and may also be employed in conjunction with the dispensing of other similar flowable materials or products.

In the presently preferred embodiment, the apparatus 10 includes dispensing means 14 generally for receiving the flowable material, from the hopper 12 as shown. The dispensing means 14 comprises a two position rotary valve 16 which includes an inlet port 18. A suitably sized conduit or pipe 20 provides communication between the hopper 12 and the valve inlet port 18 to permit the material to flow from the hopper 12 into the valve 16 when the valve is in a first or charging position as shown in FIG. 1.

The valve 16 also includes an outlet port 22 for dispensing the flowable material when the valve 16 is in a second or dispensing position as shown in phantom in FIG. 1. Conduit means, in the presently preferred embodiment a manifold pipe 24 extends outwardly (in the present embodiment downwardly) from the valve 16 in the communication with the valve outlet port 22 for receiving the flowable material dispensed from the valve 16.

The valve 16 further includes a charging port 26 which provides communication between the valve and a charging cylinder 28 having an open end 30 which sealingly engages the valve 16. A charging piston 32 is mounted for displacement within the charging cylinder 28 as shown. The charging piston 32 includes suitable sealing means 34 and a piston rod 36, a first end of which is attached to the charging piston 32 in the usual manner. The other end of the piston rod 36 is attached to a suitable actuator means (not shown). For purposes which will hereinafter become apparent, the charging piston 32 is displaced along the charging cylinder 28 (toward the left or right as shown in FIG. 1) as determined by the actuator means (not shown).

As discussed briefly above, the apparatus 10 is employed for consistently dispensing a pre-determined quantity of flowable material, in the presently preferred embodiment semi-frozen ice cream which may contain randomly interspersed solids of various particle sizes, from the material source or hopper 12 and into a suitably sized container, mold or the like (not shown). Since the container or mold which receives the flowable material is designed to hold only a specific, predetermined quantity of the material (i.e. quart), it is desireable to consistently dispense only precisely the required predetermined quantity of material to each such mold or container. In this manner, successive molds or containers are not either over filled, resulting in spillage and waste, or underfilled, resulting in the possible short changing of the consumer. As will hereinafter be described, underfilling which may be caused by the lodging of solid pieces or by other clogging or blocking of the various components of the apparatus 10 can be quickly and conveniently rectified without significant disruption of the filling operation.

In the operation of the apparatus 10 as thus far described, the rotary valve 16 is first actuated into the charging position as shown in FIG. 1 to provide direct communication through the valve 16 between the inlet port 18 and the charging port 26. The charging piston 32 is then moved along the charging cylinder 28 away from the valve 16 (toward the right when viewing FIG. 1) by the actuator means (not shown). The movement of the piston 32 reduces the pressure in the charging cylinder adjacent to the charging port 26 to create a suction force which draws the flowable material from the hopper 12 through the conduit 20, valve 16 and into the charging cylinder 28. The quantity of material which is drawn into the valve 16 and the charging cylinder 28 is determined by the size of the charging cylinder 28 and the distance that the charging piston 32 travels or displaces along the charging cylinder 28. While size of the charging cylinder 28 is fixed, the displacement of the charging piston 32 is readily adjustable and can be preset to have the piston consistently displace to a particular position to consistently draw into the charging cylinder 28 a predetermined quantity or charge of material as required for the filling of a particular sized mold or container (not shown). By adjusting the displacement of the piston in this manner, the same apparatus 10 may be employed for the filling of molds or containers of various sizes.

After the predetermined quantity of material has been drawn into the charging cylinder 28, the rotary valve 16 is actuated to the second or dispensing position as shown in phantom in FIG. 1. In the dispensing position, the rotary valve 16 provides communication between the charging port 26 and the outlet port 22, as shown. With the valve 16 in the dispensing position, the charging piston 32 is moved along the charging cylinder 28 toward the valve 16 (toward the left when viewing FIG. 1), forcing the charge of material held within the charging cylinder 28 to pass under pressure through the charging port 26 and the valve 16 and to be dispensed from the outlet port 22. Thereafter, the dispensed material flows under pressure through the manifold pipe 24 and into a mold or container (not shown) positioned for filling beneath the manifold pipe 24.

The above-described filling procedure is thereafter successively repeated each time an empty mold or container (not shown) is position for filling beneath the manifold pipe 24. By precising controlling the displacement of the charging piston 32 as described above, the amount of material dispensed into each mold or container can be maintained relatively constant.

Figure 2:
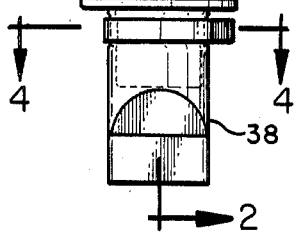
FIG. 2 is a slightly enlarged view, partially in section of a portion of the apparatus taken along line 2—2 of FIG. 1.
Figure 2:
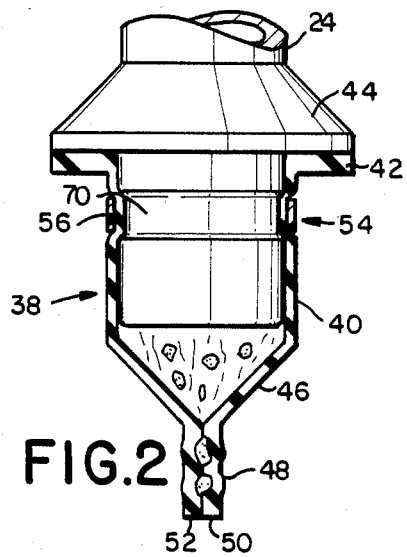

In order to prevent leakage of the flowable material from the manifold pipe 24 when no mold or container is present or when the material is being drawn into the charging cylinder 28, the apparatus 10 further includes a flap valve 38 which, as best shown in FIG. 2, is installed around the manifold pipe 24 proximate the lower or exit end. In the presently preferred embodiment, the flap valve 38 is comprised of an elastomeric material, such as, for example, rubber. The flap valve 38 includes a generally cylindrical body portion 40 which has an inner diameter which is slighly less than the outer diameter of the manifold pipe 24. In this manner, when the flap valve body portion 40 is installed around the outer surface of the manifold pipe 24 the body portion 40 is stressed and provides a tight seal against the outer surface of the manifold pipe 24.

The upper end of the flap valve body portion 40 also includes an outwardly extending generally annular flange 42. The flange 42 seats or abuts against a complimentary, generally annular shoulder 44 extending outwardly around the outer surface of the manifold pipe 24. The annular manifold pipe shoulder 44 is located above the exit end of the manifold pipe 24 a distance which is approximately the same as the axial length of the flap valve body portion 40. In this manner, a visual indication is provided that the flap valve 38 is properly installed upon the manifold pipe 24.

Beginning at a point slightly below the lower exit end of the manifold pipe 24, the flap valve 38 tapers inwardly on two sides as shown at 46 to form a closure portion 48 on the distal end thereof. The closure portion 48 comprised of a pair of generally flat elongated lips 50 and 52 which are pre-stressed to remain in abutting engagement to thereby keep the flap valve 38 tightly closed to prevent the leakage of material when the material is not being dispensed.

Figure 3:
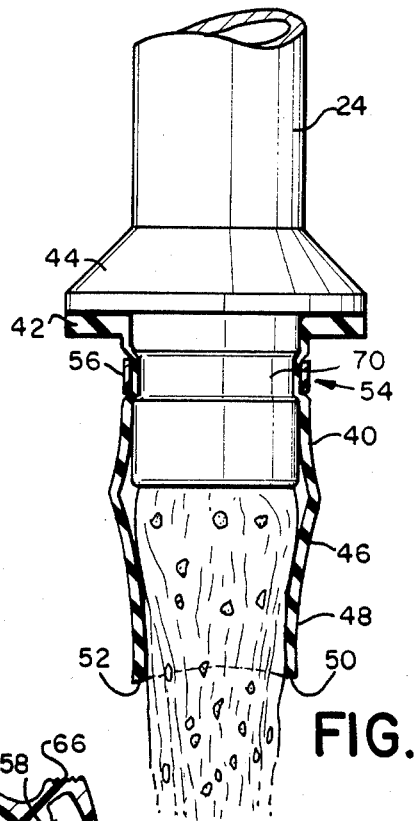
FIG. 3 is a view similar to that of FIG. 2 but showing the elastomeric flap valve in the open position with the material to be dispensed flowing therethrough.

When the valve 16 is in the discharge position and the dispensed material flows under pressure through the manifold pipe 24, the pressure of the material upon the flap valve tapered portion 46 overcomes the pre-stress of the closure portion 48 and causes the lips 50 and 52 to separate, thereby opening the flap valve to permit the flow of the dispensed material therethrough. As shown in FIG. 3. the flap valve closure portion 48 opens to form a generally cylindrical conduit or passage having substantially the same diameter as that of the manifold pipe 24 to provide for the free, unobstructed flow of the material therethrough. This feature is particularly important when the material being dispensed is not homogeneous, such as, ice cream having randomly interspersed solids of various particle sizes. By having the flap valve closure portion 48 open to substantially the same size as the manifold pipe 24 such nonhomogeneous material can flow freely through the valve at the requisite flow rate and in the requisite quantity to fill the molds or containers (not shown) to the proper levels on a consistent basis.

Once the charge of material has been dispensed and the pressure upon the flap valve tapered portion 46 is sufficiently reduced, the closure portion 48 of the flap valve 38 again assumes the closed position with the lips 50 and 52 tightly abutting as shown in FIG. 2, thereby retaining any material which remains within the flap valve 38 or the manifold pipe 24. Due to the elastomeric nature of the flap valve 38, the closure portion 48 closes over and contains any small solid pieces which remain within the closure portion 48. (See FIG. 2.) The length of the closure portion 48 is sufficient to permit the lips 50 and 52 to conform to the shape of the solid particles and to form a tight seal despite the containment of the sold pieces. Thereafter, when the closure portion 48 is reopened, the contained solid pieces freely flow out of the flap valve 38 along with the dispensed material.

Figure 4:
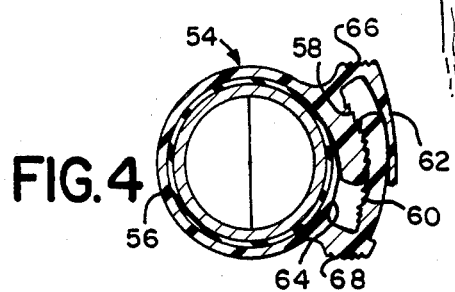
FIG. 4 is a slightly enlarged sectional view of a portion of the apparatus taken along line 4—4 of FIG. 1.

A clamping means 54 extends around the outer surface of the flap valve body portion 40 for securely clamping the flap valve 38 to the manifold pipe 24. In the presently preferred embodiment, the clamping means 54 comprises a one piece generally arcuate releasable clamp member 56 (see FIG. 4) having complimentry rows of teeth 58 and 60 on the ends thereof. As shown in FIG. 4, the rows of teeth 58 and 60 face each other and suitable, generally arcuate flange members 62 and 64 are provided to maintain the rows of teeth 58 and 60 in engagement with each other. The clamp member 56 is installed around the flap valve body portion 40 by squeezing the clamp member ends together at pads 66 and 68 to interengage the rows of teeth 58 and 60.

The manifold pipe 24 also includes a generally annular groove 70 extending around its outer surface at a point slightly below the annular shoulder 44. The clamp member 56 preferably engages the flap valve body portion 40 at a position which is axially aligned with the groove 70. The clamp member 56 is then tightened around the groove 70 to provide a tight clamping force which prevents the flap valve 38 from slipping off the manifold pipe 24.

The clamp member 56 is readily releasable by simply moving the rows of teeth laterally with respect to each other. (i.e. viewing FIG. 4., into and out of the paper). Once the clamp member 56 is released, the flap valve 38 may be easily removed from the manifold pipe 24. The convenient removability of the flap valve 38 is particularly important to facilitate cleaning of both the flap valve 38 and the remainder of the dispensing apparatus 10. In addition if either the flap valve 38, manifold pipe 24 and the other parts of the dispensing apparatus 10 become clogged, for example due to the lodging of an unusually large-sized solid piece, the solid piece can be dislodged or the clogged component can otherwise be quickly and conveniently unclogged without unduly affecting or slowing the mold or container filling operation.

From the foregoing description, it can be seen that the present invention comprises an apparatus for dispensing flowable material including non-homogeneous material which contains interspersed solids of varying particle sizes, which includes a readily removable, self-closing elastomeric flap valve for preventing leakage of the material. It will be recognized by those still in the art that changes may be made to the above-described presently preferred embodiment of the invention without departing from the broad inventive concepts thereof. It is understood, therefore, that this invention is not limited to the particular embodiment disclosed, but it is intended to cover all modifications which are within the scope and spirit of the invention as defined by the appended claims.

I claim:

1. An apparatus for dispensing a non-homogeneous flowable material containing interspersed solids from a flowable material source comprising:

dispensing means for receiving the material from the material source and for dispensing the material under pressure;

conduit means comprising a generally cylindrical manifold pipe in communication with the dispensing means for receiving the dispensed material, the manifold pipe including a groove extending around the outer surface thereof and an outwardly projecting annular shoulder extending around at least a portion of the outer surface thereof;

a self-closing, elastomeric flap valve having a generally cylindrical body portion which surrounds and is sealed against the manifold pipe, before being installed around the manifold pipe, the body portion having an inside diameter slightly smaller than the outside diameter of the manifold pipe, the body portion being stressed when installed around the manifold pipe to provide a tight seal, the body portion including an outwardly extending annular flange, the annular flange abutting the annular shoulder when the flap valve is installed on the manifold pipe, the flap valve having a closure portion which is prestressed to remain closed to prevent leakage of the material when no pressure is applied to the dispensed material and which opens to substantially the same dimension as the manifold pipe to permit unobstructed flow of material therethrough upon the application of sufficient pressure upon the dispensed material to force the dispensed material through the closure portion, the closure portion including a pair of generally flat elongated lips which are prestressed to remain in abutting engagement with each other when no pressure is applied to the dispensed material, the length of the lips being such that if any solids remain in the closure portion when no pressure is applied, the lips surround and conform to the shape of the solids to contain the solids and to form a tight seal to prevent leakage of the material; and clamping means extending around the flap valve body portion axially aligned with the groove for securing the flap valve to the manifold pipe.

* * * * *